(12) United States Patent
Lapinski

(10) Patent No.: US 9,190,016 B2
(45) Date of Patent: Nov. 17, 2015

(54) COLOR-MATCHING TOOL FOR VIRTUAL PAINTING

(71) Applicant: Valspar Sourcing, Inc., Minneapolis, MN (US)

(72) Inventor: Anne E. Lapinski, Mount Prospect, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 147 days.

(21) Appl. No.: 13/815,788

(22) Filed: Mar. 15, 2013

(65) Prior Publication Data

US 2014/0267364 A1    Sep. 18, 2014

(51) Int. Cl.
| | | |
|---|---|---|
| G09G 5/00 | (2006.01) |
| G09G 5/02 | (2006.01) |
| G06T 15/60 | (2006.01) |
| G09G 5/36 | (2006.01) |
| H04N 5/202 | (2006.01) |
| H04N 5/46 | (2006.01) |
| H04N 1/40 | (2006.01) |
| G06K 9/00 | (2006.01) |
| G06K 9/40 | (2006.01) |
| G03F 3/08 | (2006.01) |
| G06F 17/00 | (2006.01) |
| G06K 9/36 | (2006.01) |

(52) U.S. Cl.
CPC . *G09G 5/026* (2013.01); *G09G 5/02* (2013.01)

(58) Field of Classification Search
USPC ......... 345/418, 426, 428, 581, 589–591, 593, 345/600–601, 606, 629, 630, 643, 501, 520, 345/549, 690; 348/254, 256, 552, 557, 560, 348/563–564, 576, 577; 358/518–520, 523, 358/525, 448; 382/162, 166–167, 254, 274, 382/276, 307; 715/273, 275, 700
See application file for complete search history.

(56) References Cited

U.S. PATENT DOCUMENTS

| | | | |
|---|---|---|---|
| 5,046,027 | A | 9/1991 | Taaffe et al. |
| 5,581,670 | A | 12/1996 | Bier et al. |
| 6,005,969 | A | 12/1999 | Thomas et al. |
| 6,587,592 | B2 | 7/2003 | Georgiev et al. |
| 6,650,771 | B1 | 11/2003 | Walker |
| 6,985,263 | B2 | 1/2006 | Georgiev et al. |
| 7,471,417 | B1 | 12/2008 | Chien |
| 7,593,603 | B1 | 9/2009 | Wilensky |
| 7,978,938 | B1 | 7/2011 | Wilensky |
| 7,990,574 | B2 | 8/2011 | Cairns |
| 7,991,224 | B2 | 8/2011 | Andrew et al. |
| 8,004,536 | B2 | 8/2011 | Wilensky |

(Continued)

*Primary Examiner* — Wesner Sajous
(74) *Attorney, Agent, or Firm* — Shumaker & Sieffert, P.A.

(57) ABSTRACT

A method for virtually painting an image, the method comprising providing an image having a plurality of image pixel units, generating luminosity values based on color data (e.g., RGB triplets and LAB triplets) from the image pixel units, receiving a selection of one of the image pixel units, and setting a reference luminosity value based at least in part on a luminosity value of the selected image pixel unit (corresponding to a desired midpoint brightness). The method also comprises receiving a selection of a new color for virtually painting the image, calculating luminosity differences between the reference luminosity value and the luminosity values of the image pixel units, and generating and displaying overlay pixel units as an overlay with the image based on the calculated luminosity differences and the selected new color.

20 Claims, 12 Drawing Sheets
(8 of 12 Drawing Sheet(s) Filed in Color)

(56) References Cited

U.S. PATENT DOCUMENTS

| | | |
|---|---|---|
| 8,175,409 B1 | 5/2012 | Wilensky |
| 2007/0085910 A1 | 4/2007 | Anderle et al. |
| 2007/0296365 A1* | 12/2007 | Messerly et al. ............ 318/568.1 |
| 2010/0149204 A1* | 6/2010 | Han ............................... 345/589 |
| 2012/0050345 A1* | 3/2012 | Higashi et al. ................ 345/690 |
| 2013/0120427 A1* | 5/2013 | DiVerdi et al. ................ 345/589 |
| 2013/0120436 A1* | 5/2013 | Krishnaswamy et al. .... 345/594 |
| 2014/0011040 A1* | 1/2014 | Decker et al. ................. 428/457 |

\* cited by examiner

COLOR-MATCHING TOOL FOR VIRTUAL PAINTING

FIELD

The present disclosure relates to digital image modification tools. In particular, the present disclosure relates to computer-based tools for changing colors in digital images, such as for color matching or selection purposes to assist users in selecting paints.

BACKGROUND

Paint manufacturers typically distribute premixed paints in a small number of popular colors. To accommodate user desires and enable matching of existing painted surfaces, paint manufacturers typically also distribute a set of tintable base paints and several concentrated colorants. These are combined in point-of-sale outlets using color dispensing and shaker equipment to make small batch lots of custom-tinted paint or stain in a much larger array of colors than the limited colors available in premixed products.

To assist consumers in selecting colors, paint manufacturers may provide small color cards, also commonly referred to as paint cards or paint chips, showing a color or range of related paint colors available. Typically, a consumer will obtain one or more color cards with desired colors from a local retail store or via online ordering. The consumer may then hold each color card up against a surface to be painted for color matching or selection purposes. However, the use of color cards can be a time consuming process, and does not allow the consumer to see how the entire surface will appear with the given colors, particularly areas of the surface the different lighting conditions. Thus, there remains an ongoing desire by paint manufacturers and retailers to assist consumers in selecting which paint colors to use.

SUMMARY

An aspect of the present disclosure is direct to a method for virtually painting an image with a computer system. The method includes providing an image having a plurality of image pixel units, where each image pixel unit comprises first color data (e.g., an RGB triplet and/or a (L*a*b*) triplet). The method also includes generating a luminosity map having a plurality of luminosity values based on the first color data from the image pixel units, receiving a selection of one of the image pixel units, and setting a reference luminosity value based at least in part on a luminosity value of the selected image pixel unit (corresponding to a desired midpoint brightness). The method further includes receiving a selection of a new color for virtually painting the image, where the selected new color includes second color data. The method also includes calculating luminosity differences between the reference luminosity value and the luminosity values of the image pixel units, generating overlay pixels based on the calculated luminosity differences and the second color data, and displaying the generated overlay pixel units as an overlay with the image.

Another aspect of the present disclosure is directed to a method for virtually painting an image with a computer system, which includes receiving an image having a plurality of image pixel units, where each image pixel unit includes first color data, and generating luminosity values based on the first color data of the image pixel units. The method also includes receiving a selection of one of the image pixel units, and setting a reference luminosity value based at least in part on a luminosity value of the selected image pixel unit (corresponding to a desired midpoint brightness), and calculating a luminosity difference between the reference luminosity value and the luminosity value of at least a second pixel unit of the image pixel units. The method further includes generating an overlay pixel unit based on the calculated luminosity difference and second color data of a color for virtually painting the image.

A further aspect of the present disclosure is directed to a method for virtually painting an image with a computer system, which includes receiving an image having a plurality of image pixel units, wherein at least a portion of the plurality of image pixel units define a digital representation of a photographed surface. The method also includes calculating a luminosity value for each of the plurality of image pixel units, receiving a selection of one of the image pixel units within the photographed surface, and setting a reference luminosity value based at least in part on a luminosity value of the selected image pixel unit (corresponding to a desired midpoint brightness). The method further includes receiving a selected new color having color data, determining a boundary of the photographed surface, calculating luminosity differences between the reference luminosity value and the luminosity values of the image pixel units within the determined boundary, and generating overlay pixel units based on the calculated luminosity differences and the color data of the selected new color.

DEFINITIONS

Unless otherwise specified, the following terms as used herein have the meanings provided below:

The term "pixel unit" encompasses an individual pixel, a set of multiple pixels (e.g., a vectorized set of pixels), and combinations of individual pixels and sets of multiple pixels. For example, an image having a plurality of pixel units, where each pixel unit includes color data (e.g., an RGB triplet) may refer to an image having (i) a plurality of individual pixels each including color data, (ii) a plurality of sets of multiple pixels, where each group includes color data, or (iii) a combination of (i) and (ii).

The term "luminosity" refers to a measurement of brightness, such as a brightness of a pixel unit as calculated from its color data (e.g., from its RGB triplet or LAB triplet).

The terms "about" and "substantially" are used herein with respect to measurable values and ranges due to expected variations known to those skilled in the art (e.g., limitations and variabilities in measurements).

The terms "preferred" and "preferably" refer to embodiments of the invention that may afford certain benefits, under certain circumstances. However, other embodiments may also be preferred under the same, or other circumstances. Furthermore, the recitation of one or more preferred embodiments does not imply that other embodiments are not useful, and is not intended to exclude other embodiments from the scope of the invention.

The term "providing", such as for "providing an image", when recited in the claims, is not intended to require any particular delivery or receipt of the provided item. Rather, the term "providing" is merely used to recite items that will be referred to in subsequent elements of the claim(s), for purposes of clarity and ease of readability.

The term "processor" for a computer system is intended to include the singular and plural forms of a processor. In other words, the term "processor" may include one or more processors. Similarly, the term "computer storage medium" and "data storage device" are each intended to include their singular and plural forms. In other words term "computer storage medium" may include one or more of such media, and the term "data storage device" may include one or more of such devices.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present disclosure is directed to a color-matching tool run by a computer system, and which allows users to virtually paint walls or other surfaces with different colors, such as for color matching or selection purposes. For example, a user may desire to paint a wall of a room with a different color, but may not be sure which color will look the best in the given lighting conditions. In a conventional setting, the user would obtain paint samples of desired colors, and paint the given wall or surface with swatches to view the different colors in proper lighting conditions.

However, painting swatches can be time consuming, and only allows the user to see how the lighting conditions affect the colors at the given locations of the swatches. This can prevent the users from appreciating how shadows and direct light (e.g., sunlight) can affect the appearances of painted colors. Furthermore, the swatches are limited to the particular color samples that the user obtains, thereby effectively reducing the number of colors that the user may test.

Figure 1:
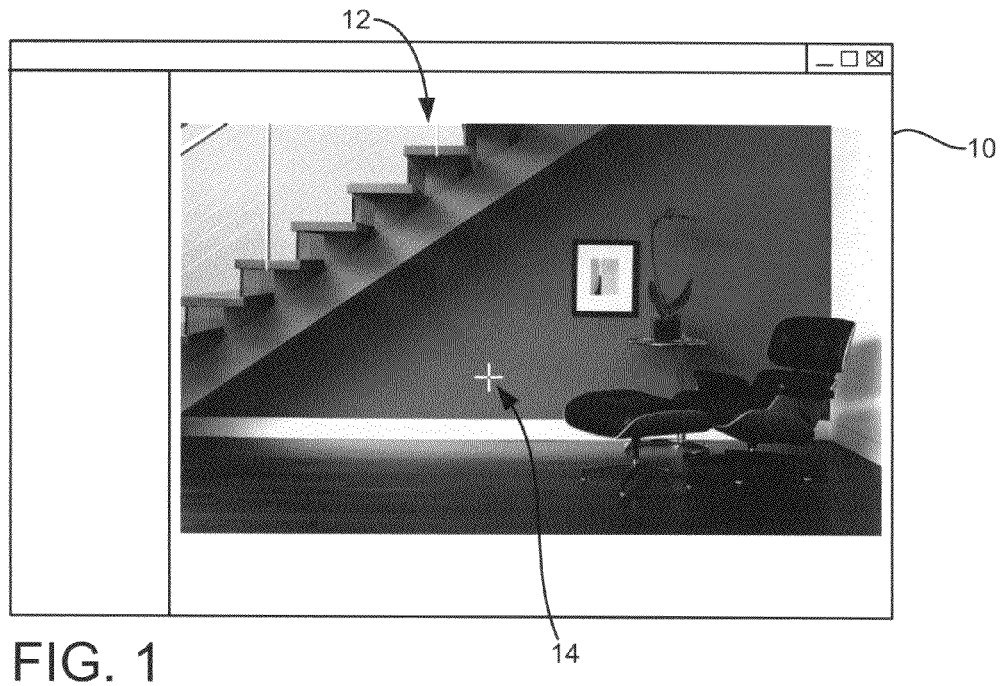
FIG. 1 is an illustration and color photograph of a color-matching tool application of the present disclosure with a received digital image prior to virtual painting.

Instead, the color-matching tool of the present disclosure allows a user to virtually paint a wall or surface using a computer, which allows the user to conveniently view a large number of different colors in a manner that accounts for proper lighting conditions. Briefly, a user may take a photograph of a desired wall or other surface to be painted under proper lighting conditions. As shown in FIG. 1, the user may then use a computer to run a computer application of the color-matching tool (referred to as color-matching tool (CMT) application 10), and load the photograph as a digital image 12 to the running CMT application 10. As shown, image 12 includes a digital representation of a photographed wall to be painted.

Then, using CMT application 10, the user may select a pixel unit location in the loaded digital image 12 that represents a desired midpoint brightness of the wall, based on the lighting conditions from the photograph, and based on the user's own knowledge of the lighting conditions in the room or area where the photograph was taken (e.g., reference pixel unit 14). The human eye is good at identifying a desired midpoint brightness, which accounts for portions of the wall that are darkened by shadows, or alternatively, are illuminated by direct light (e.g., sunlight), and can be highly subjective based on a user's preferences.

Figure 2:
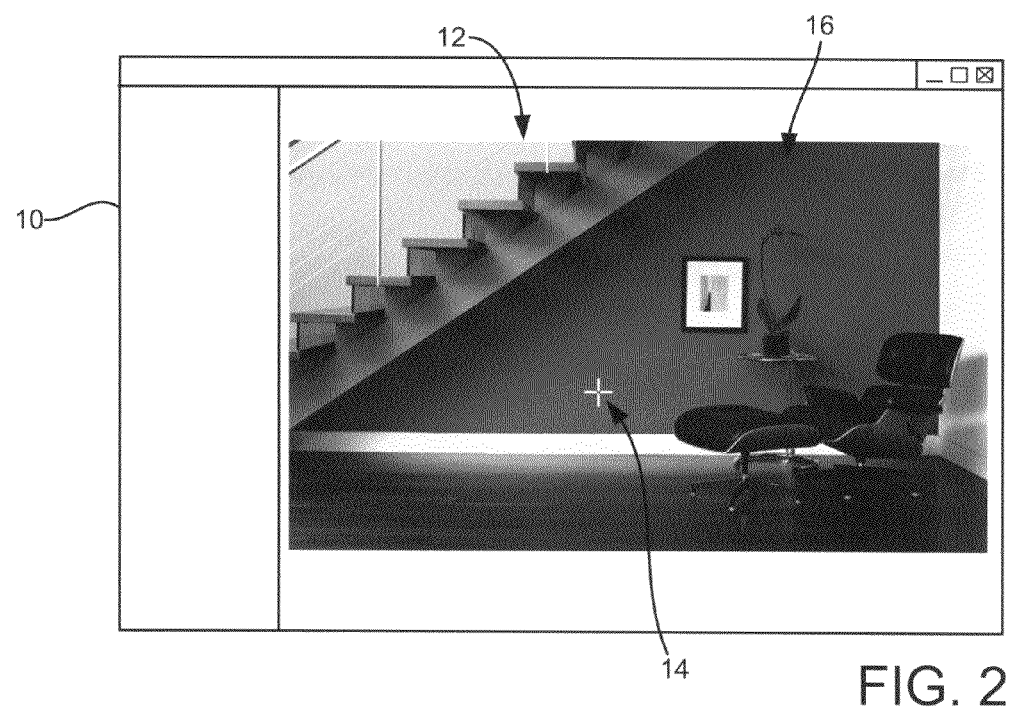
FIG. 2 is an illustration of the color-matching tool application with the received digital image after virtual painting.

As discussed below, CMT application 10 may then use a luminosity value of the selected reference pixel unit 14 as a midpoint or "reference brightness value" for changing the color of the selected wall. The user may then select a desired color to apply to the wall, such as from a color palette. As shown in FIG. 2, CMT application 10 may then virtually paint an overlay 16 over the original wall image with the selected color. For example, when the user selects a blue color and virtually paints the wall with the blue color (e.g., as shown in FIG. 2), CMT application 10 may automatically adjust the brightness of each pixel of overlay 16 based on the reference brightness value from reference pixel unit 14. This simulates how the lighting conditions, such as shadows and direct light, can affect the selected color as it appears to the human eye.

The user may also move the selected pixel unit location for the reference brightness value from reference pixel unit 14 to another pixel unit location in the image 12. This allows the user to interact with the room or area to see how different lighting conditions can affect the selected color. For example, if the user moves the selected pixel unit location to a different location along the shown wall, CMT application 10 may then automatically adjust the brightness of each pixel unit of overlay 16 based on the new reference brightness value.

Furthermore, if the user wishes to select a different overlay color, he or she may select a new color (e.g., from the color palette), and apply the new color to the wall in the same manner to generate a new color overlay 16. This can repeated as often as desired by the user until a final color is selected. The user may then refer to the final color when purchasing the paint for physically painting the wall. In some embodiments, CMT application 10 may include a color palette linked to particular paints or paint tint recipes. The user may then directly purchase the paint with the final color based on the linked color palette using CMT application 10, or may use a product color number or name for the selected paint and bring the serial number to a local retail store to purchase the paint. Accordingly, CMT application 10 increases the ease and versatility in which users can select paint colors for a variety of different surfaces and lighting conditions.

Figure 3:
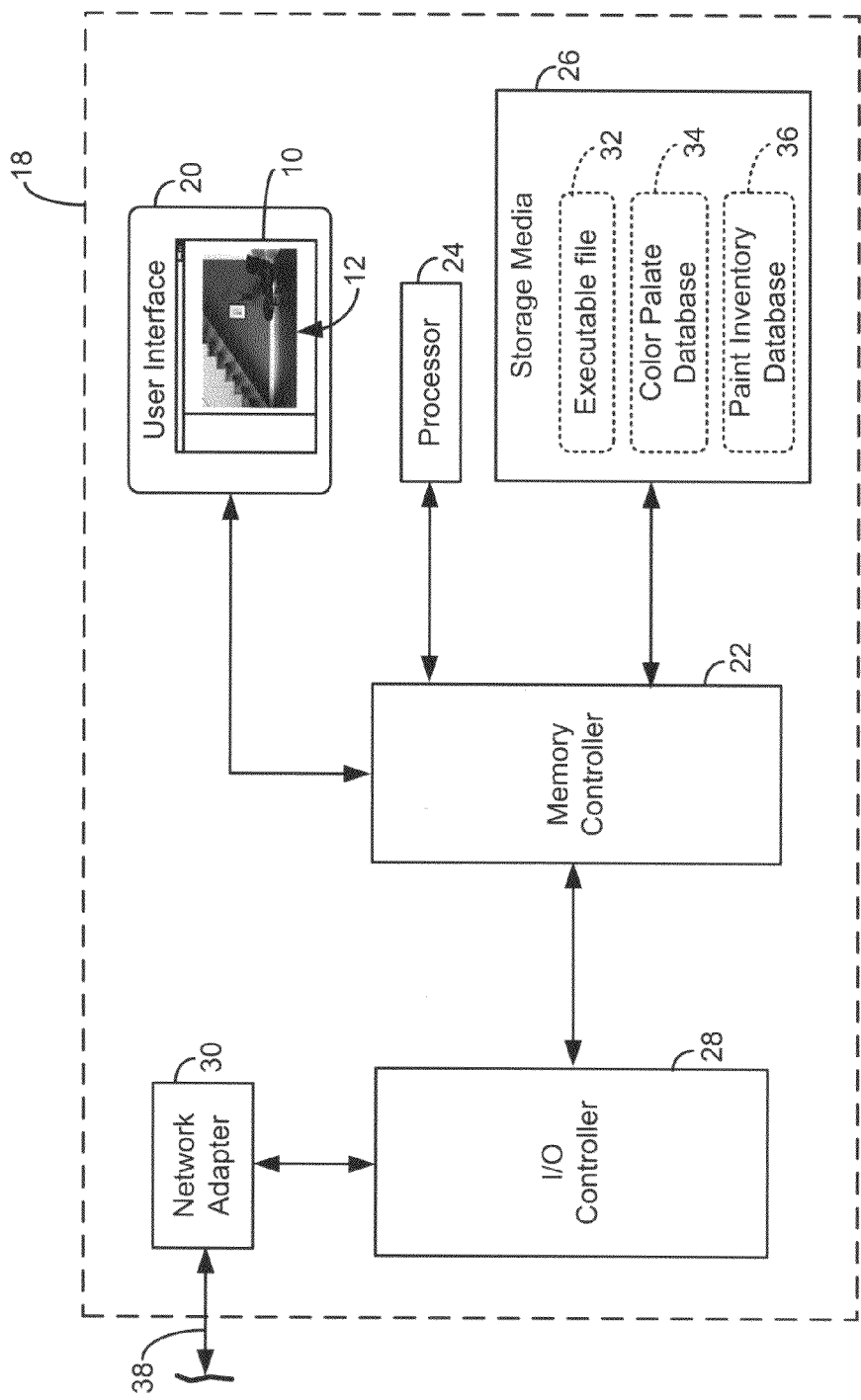
FIG. 3 is a schematic illustration of an example computer architecture for using the color-matching tool application.

FIG. 3 illustrates an example computer architecture for utilizing CMT application 10. In this embodiment, CMT application 10 is run on a computer 18, which may be one or more personal computers, laptop computers, server systems, and/or portable media devices such as a smart phone, portable media player, personal digital assistant (PDA), tablet device, and the like. However, CMT application 10 may alternatively be utilized with a variety of different computer architectures. For example, CMT application 10 may be stored on one or more servers (e.g., cloud servers), and accessed over the Internet or other network connections by multiple remote computer devices. Accordingly, the term "computer system", with reference to computer applications of the color-matching tool of the present disclosure (e.g., CMT application 10), may include any suitable computer architecture of one or more computer devices.

As shown in FIG. 3, computer 18 may include user interface 20, memory controller 22, processor 24, storage media 26, input/output (I/O) controller 28, and network adapter 30. Computer 18 may also include a variety of additional components that are contained in conventional computers, servers, and/or media devices. Additionally, computer 18 may be used in conjunction with one or more color-measurement devices, such as spectrophotometers, colorimeters, digital swatch books, spectro colorimeters, spectro densitometers, charge-coupled device (CCD)-based units, and the like.

User interface 20 is a user-operated interface (e.g., keyboards, touch pads, touch-screen displays, and other eye, voice, or hand-operated controls) configured to operate computer 18 and run CMT application 10. Memory controller 22 is a circuit assembly that interfaces the components of computer 18 with one or more volatile random access memory (RAM) modules of storage media 26. Processor 24 is one or more computer-processing units configured to operate computer 18, and optionally, with memory controller 22, may perform all of the functions for running CMT application 10.

Storage media 26 is one or more internal and/or external data storage devices or computer storage media for computer 18, such as volatile RAM modules, read-only memory modules, optical media, magnetic media (e.g., hard disc drives), solid-state media (e.g., FLASH memory and solid-state drives), analog media, and the like. Storage media 26 may retain an executable copy of CMT application 10, referred to as stored executable file 32, as well as color palette database 34 and paint inventory database 36. Alternatively, color palette database 34 and/or paint inventory database 36 may be located on one or more remote computer devices (e.g., a cloud server), or may be incorporated into stored executable file 32 of CMT application 10.

I/O controller 28 is a circuit assembly that interfaces memory controller 22, processor 24, and storage media 26 with various input and output components of computer 18, including network adapter 30. Network adapter 30 is one or more wired or wireless transmitter/receiver adapters configured to communicate over network line 38. For example, network adapter 30 may be a direct local area network or internet connection adapter, a cellular wide area network transmitter/receiver, a Wi-Fi local area network transmitter/receiver, or combinations thereof.

During use, the user may access user interface 20 on computer 18 to start CMT application 10 from stored executable file 32. The user may then load image 12 to CMT application 10, where computer 18 (e.g., processor 24) may store a copy of the loaded image 12 to storage media 26. Alternatively, the user may open image 12 from a previously-saved working project in CMT application 10. Image 12 may be provided from any suitable source, such as from image scanners, digital cameras, smart phones, other computers, internet-based websites (e.g., social media sites), and the like.

The user may then use CMT application 10 to virtually paint the walls or other surfaces in image 12, where computer 18 generates overlay 16 (e.g., as shown in FIG. 2) based on the user selections. For example, when the user selects a color with CMT application 10, computer 18 may look up the corresponding color information from color palette database 34. The user may then virtually paint the walls or other surfaces in image 12 with the selected color using computer 18.

If desired, when the final color is selected, the user may use CMT application 10 to order paint from computer 18. In this case, computer 18 may also access paint inventory database 36 to determine the inventory for the final color, based on the color information from color palette database 34. The user may then conveniently complete the order with CMT application 10 and have the ordered paint (or samples of the paint) shipped or made available for pick up.

Figure 4:
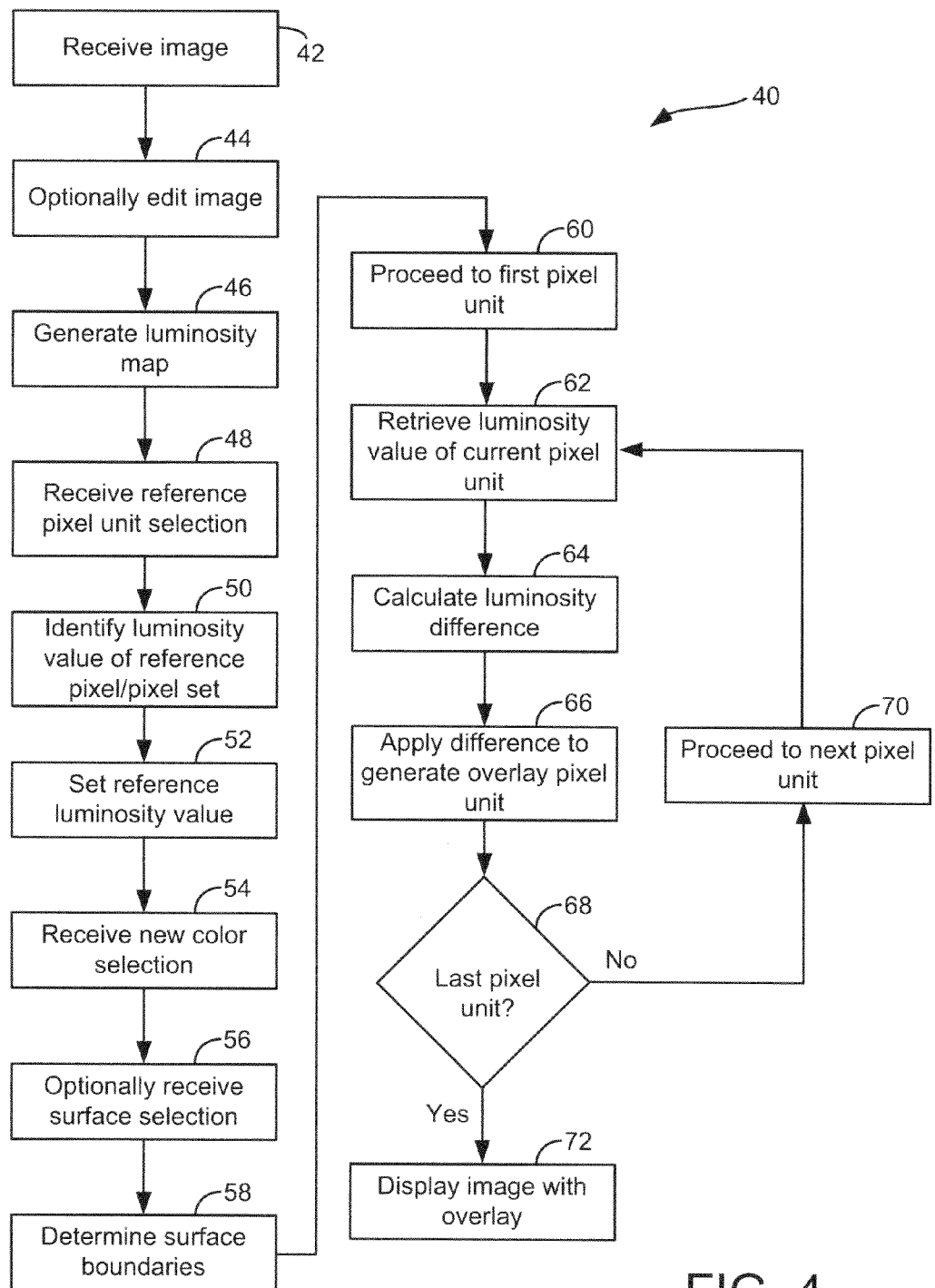
FIG. 4 is a flow diagram of an example method for virtually painting an image with the color-matching tool application.

FIG. 4 illustrates method 40, which is an example method for virtually painting a wall or other surface in a digital image with the color-matching tool of the present disclosure (e.g., CMT application 10). The following discussion of method 40 is made with reference to CMT application 10, image 12, and computer 18 with the understanding that method 40 may be used to virtually paint walls or other surfaces in a variety of different digital images and with a variety of different computer architectures. The following is a brief step through of method 40, which will be discussed in more detail below with reference to the example shown in FIGS. 5A-5M.

As shown in FIG. 4, method 40 may include steps 42-72, and initially involves receiving a digital image, such as by loading image 12 to CMT application 10 and computer 18 (step 42). The user may then optionally edit image 12 with CMT application 10, such as cropping the dimensions of image 12, masking one or more portions of image 12 to prevent overlay 16 from being applied over the masked portions, and the like (step 44). Image 12 may then be stored in storage media 26, together with any optional editing data.

Each pixel unit in the received image 12 includes color data based on a color model. For example, in an embodiment in which image 12 is based on an RGB color system, each pixel unit may have a triplet of red, green, and blue color channels, each with a color value (typically ranging from 0-255). Alternatively, each pixel unit may have color data based on different color models, such as (but not limited to) a hexadecimal color model, a LAB color model (e.g., CIE (L*a*b*) color model), a CMYK color model, an (L*c*h*) color model, an IPT color model, an XYZ color model, and the like.

Computer 18, using CMT application 10, may then analyze the color data in each pixel unit of image 12 to a generate a "luminosity map" for image 12 (step 46). Preferably, for each pixel unit in image 12, computer 18 generates a "luminosity value" from the color data of the given pixel unit, where the luminosity map is a matrix of the pixel luminosity values.

The luminosity value for each pixel unit may be generated based on the particular color model used. In the above-discussed RBG triplet embodiment, computer 18 may calculate an average value of the three channels in the RGB triplet, and use this average value as the luminosity value for the pixel unit. For example, if a given pixel unit in image 12 has an RGB triplet of (255; 57; 31) (a red color), the generated luminosity value for the given pixel unit based on the triplet average is 114.

In some embodiments, the calculated average may be based on a weighted average value of the three channels in the RGB triplet, such as for relative luminance that follows the formula $Y=0.2126$ (red channel)$+0.7152$ (green channel)$+0.0722$ (blue channel), where "Y" is the calculated luminosity value for the pixel unit. The weighting for relative luminance reflects the fact that green light contributes the most to the intensity perceived by the human eye, and blue light contributes the least. Accordingly, based on a relative luminance for image 12 has an RGB triplet of (255; 57; 31), the generated luminosity value for the given pixel unit based on the triplet average is 97.

Alternatively, under a LAB color model, the luminosity value for the pixel unit may be attained directly from the L-component of the (L*a*b*) or LAB triplet (typically ranging from 0-100). For example, using the same red color as discussed above for the RGB color model, the LAB triplet is about (56; 72; 60). Thus the luminosity value for the pixel unit may be attained directly from the L-component of this LAB triplet, which is about 56.

This process may be repeated for each pixel unit in image 12 to generate the luminosity map for image 12, where the generated luminosity values of the luminosity map may be stored in storage media 26. CMT application 10 may then prompt the user to select a pixel unit location in image 12 that represents a desired midpoint brightness of the wall or surface, based on the lighting conditions from the photograph, and based on the user's own knowledge of the lighting conditions in the room or area where the photograph was taken (e.g., reference pixel unit 14 shown in FIGS. 1 and 2). As mentioned above, the human eye is good at identifying a desired brightness, which accounts for portions of the wall that are darkened by shadows, or alternatively, are illuminated by direct light (e.g., direct sunlight or artificial light).

Once CMT application 10 receives the user selection of reference pixel unit 14 (step 48), computer 18 may look up or otherwise identify the luminosity value of reference pixel unit 14 from the generated luminosity map retained in storage media 26 (step 50). In a first embodiment, computer 18 may set this luminosity value as the midpoint or "reference brightness value" for generating overlay 16 (step 52).

Alternatively, in a second embodiment, computer 18 may set the middle luminosity value of a shifted and narrower luminosity scale as the midpoint or "reference brightness value" for generating overlay 16, pursuant to step 52. For example, the luminosity scale of the L-component of a LAB color model typically ranges from 0-100, where the middle luminosity value of the scale is therefore "50". If the L-component of a LAB triplet for reference pixel unit 14 is "60", the luminosity scale for overlay 16 will be shifted upward by a difference amount 60−50=10, where the upper end of the scale is clipped at "100". As such, the shifted and narrower luminosity scale for overlay 16 will range from 10-100 rather than from 0-100. In this case, rather than using the luminosity value of reference pixel unit 14 as the reference brightness value for generating overlay 16, computer 18 may instead use the middle value of this narrower 10-100 luminosity scale (i.e., "55") as the reference brightness value for generating overlay 16.

Following another example, if the L-component of a LAB triplet for reference pixel unit 14 is "30", the luminosity scale for the subsequently generated overlays will be shifted downward by a difference amount 30−50=−20, where the lower end of the scale is clipped at "0". As such, the shifted and narrower luminosity scale for overlay 16 will range from 0-80 rather than from 0-100. In this case, computer 18 may instead use the middle value of this narrower 0-80 luminosity scale (i.e., "40") as the midpoint or reference brightness value for generating overlay 16.

Under either embodiment, this reference brightness value may then be stored in storage media 26. CMT application 10 may then prompt the user to select a new color to virtually paint a desired wall or other surface in image 12. For example, the user may select the new color from color palette database 34, and/or may select the new color from a list of previously-saved "favorite" colors, where the selected color has its own color data, such as an RBG triplet or a LAB triplet. Once CMT application 10 receives the user's new color selection (step 54), the color data of this new color selection may be stored in storage media 26.

CMT application 10 may then prompt the user to select which wall or other surface to virtually paint. In particular, CMT application 10 may optionally allow the user to select a pixel unit in image 12 corresponding to a wall or other surface to be virtually painted. For example, CMT application 10 may provide the user a selection cursor to manually select a pixel unit in image 12, may provide the user a tool to manually outline a region of pixels unit in image 12, or the like. Alternatively, CMT application 10 may use the reference pixel unit 14 as this selected pixel unit. Upon receipt of this "surface selection" (step 56), computer 18 may store this surface selection in storage media 26 and determine boundaries of the wall or surface to be virtually painted (step 58). This preferably prevents overlay 16 from being generated over regions of image 12 that the user does not want to be virtually painted (e.g., furniture, windows, doors, and the like in image 12).

Step 58 of method 40 may be performed using a variety of different techniques. For example, computer 18 may compare the color data and/or luminosity values of the pixel unit selected in step 56 to those of adjacent pixel units in image 12. If the differences between their color data and/or luminosity values fall within a threshold range, then computer 18 may designate these pixel units as part of the same wall or surface to be virtually painted. However, if the color or luminosity values are too different (i.e., outside of the threshold range), computer 18 may conclude that the given pixel units correspond to a different wall or surface that the user does not want painted.

CMT application 10 may also provide the user with an option to adjust the threshold range to encompass more or less surface area in image 12 for generating overlay 16. The pixel units that are designated as being part of the same wall or surface to be virtually painted, which collectively define an overlay map, may then be stored in storage media 26. In some embodiments, prior to performing step 58, CMT application 10 may optionally compare the color data and/or luminosity values of the pixel unit selected in step 56 to those of the reference pixel unit 14 received in step 48. If the differences between their color data and/or luminosity values fall outside of the threshold range, then CMT application 10 may optionally prompt the user to select a new pixel unit pursuant to step 56 to prevent subsequent analysis based on large color or luminosity differences, or to accept the currently selected pixel despite the large differences.

As can be appreciated, CMT application 10 may perform steps 56 and 58 of method 40 with or without user intervention. In some embodiments, CMT application 10 may initially prompt the user to manually select a pixel unit in image 12 (or outline a region of pixel units in image 12) corresponding to a wall or other surface to be virtually painted (step 56), and then automatically generate the surface boundaries based on a predefined threshold in step 58. Alternatively, CMT application 10 may automatically use the reference pixel unit 14 as the selected pixel unit in step 56, and then automatically generate the surface boundaries based on a predefined threshold in step 58.

Pursuant to the following steps 60-72, computer 18 may then generate and display overlay 16 over the selected wall or surface in image 12. Initially, computer 18 may proceed to a first pixel unit of the wall or surface to be virtually painted (step 60), and retrieve the luminosity value of this first pixel unit from the generated luminosity map (step 62). Computer 18 may select any suitable order for analyzing the pixel units, and typically depends on how the data is stored in data arrays for expediting computations. As such, the term "first pixel unit" is not intended to be limited to any particular pixel unit location, and merely refers to the particular pixel unit being the first to be chronologically analyzed.

Computer 18 may then calculate the difference between the reference brightness value set in step 52 (e.g., the luminosity value of the reference pixel unit 14 or a middle value of a shifted and narrowed luminosity scale) and the retrieved luminosity value of the first pixel unit from step 62 (step 64). This determines the difference in brightness between the reference pixel unit 14 and the current pixel unit. If the current pixel unit is darker than the reference pixel unit 14, then the difference will be a positive value. For example, if the luminosity value of the reference pixel unit 14 is "114", and the retrieved luminosity value of the current pixel unit is "102" (i.e., darker than pixel unit 14), then the calculated difference in step 64 is "12". Alternatively, if the current pixel unit is brighter than the reference pixel unit 14, then the difference will be a negative value. For example, if the luminosity value of the reference pixel unit 14 is "114", and the retrieved luminosity value of the current pixel unit is "120" (i.e., brighter than pixel unit 14), then the calculated difference in step 64 is "−6".

Computer 18 may then apply the calculated difference to the color data (e.g., the RGB triplet or LAB triplet) of the new color selected in step 54 (step 66). For example, if an RGB color model is being used, computer 18 may divide the calculated difference by the number of color channels in the RGB triplet (e.g., by three) and subtract the resulting value from each color channel in the RGB triplet of the newly selected color. This accounts for the above-discussed averaging of the color channels in the RGB triplet to obtain the luminosity values, pursuant to the previous step 46 of method 40.

In this example, if the calculated difference in step 64 is "12" and the RGB triplet of the newly selected is (70; 130; 180), then computer 18 may divide the "12" by three (for three color channels) to obtain a value of "4". This "4" value may then be subtracted from each color channel in the (70; 130; 180) triplet to provide a (66; 126; 176) triplet for the overlay pixel unit. This accounts for the difference in luminosities between the reference pixel unit 14 and the current pixel unit.

As can be appreciated, this above-discussed technique, in which the calculated difference in step 64 is evenly divided and subtracted from each color channel in the RGB color model may modify the tone of the resulting overlay pixel unit from that of the originally selected color. This is because the RGB color model is a linear color model, where the color channels are increased and decreased in equal percentages of the 0-255 color scale to change the luminosity while maintaining the same tone.

As such, in a more preferred embodiment, under step 64 of method 40, computer 18 may calculate the difference between the reference brightness value set in step 52 and the retrieved luminosity value of the first pixel unit from step 62 as a percentage of the luminosity scale rather than as an absolute number. Following the above-discussed example where the luminosity value of the reference pixel unit 14 is "114", and the retrieved luminosity value of the current pixel unit is "102" (i.e., darker than pixel unit 14), the calculated percentage difference in step 64 as a percentage of 0-255 is (114−102)/255=4.7%.

Pursuant to step 66 of method 40, computer 18 may then adjust each of the RGB color channels of the newly selected color by calculated percentage difference, and round to the nearest whole integer. For example, if the newly selected is (70; 130; 180), then 70*(1−0.047)=67, 130*(1−0.047)=124, and 180*(1−0.047)=172 to provide a (67; 124; 172) for the overlay pixel unit. This allows the color of the overlay pixel unit to maintain the same tone as the originally selected color (i.e., as the (70; 130; 180) triplet), but with a luminosity that accounts for the darker current pixel unit.

On the other hand, if the luminosity value of the reference pixel unit 14 is "114", and the retrieved luminosity value of the current pixel unit is "120" (i.e., brighter than pixel unit 14), then the calculated percentage difference in step 64 as a percentage of 0-255 is (114−120)/255=−2.4%. Pursuant to step 66, if the newly selected is again (70; 130; 180), then 70*(1+0.024)=72, 130*(1+0.024)=133, and 180*(1+0.024)=184 to provide a (72; 133; 184) for the overlay pixel unit. This also allows the color of the overlay pixel unit to maintain the same tone as the originally selected color (i.e., as the (70; 130; 180) triplet), but with a luminosity that accounts for the brighter current pixel unit.

Alternatively, if a LAB color model is being used, computer 18 may subtract the calculated difference from the L-component of the new color. For example, if the calculated difference in step 64 is "5" and the LAB triplet of the newly selected is (63; 14; 55), computer 18 may subtract "5" from the L-component to provide a (58; 14; 55) triplet for the overlay pixel unit. As can be appreciated, this also accounts for the difference in luminosities between the reference pixel unit 14 and the current pixel unit.

In any of the color models, if the calculated difference that is applied to the color data (e.g., the RGB triplet or LAB triplet) of the new color selected exceeds the value range of the channels in the given color model, computer 18 may clip the channel value to the limits of the scale. For example, if the new color data has an RGB triplet of (70; 130; 253), and the calculated value to subtract from each channel is "−5", the resulting RGB triplet may be (75; 135; 255), where the blue channel is clipped to the upper "255" range. Similarly, if the new color data has an RGB triplet of (70; 130; 3), and the calculated value to subtract from each channel is "5", the resulting RGB triplet may be (65; 125; 0), where the blue channel is clipped to the lower "0" range.

In an alternative embodiment, computer 18 may add the calculated value to each color channel in the RGB triplet or the L-component of the LAB triplet, rather than subtract the calculated value from each color channel or the L-component. This inverses the operation of CMT application 10, and may be useful in a variety of different applications.

The new color data may then be stored in storage media 26 for displaying an overlay pixel unit. This maintains the relative brightness between reference pixel unit 14 and the current pixel unit when overlay 16 is displayed.

Computer 18 may then determine whether the current pixel unit is the last pixel unit in the wall or surface to be virtually painted (step 68). If not, computer 18 may then proceed to the next pixel unit (step 70) and repeat steps 62-70 for each pixel unit to be virtually painted until the calculated difference is applied to the last pixel unit. This generates an overlap map for overlay 16 with the new color. Computer 18 may then display the resulting overlay 16 over image 12 in CMT application 10 (step 72), allowing the user to view how the lighting conditions affect the colors based on the selected pixel unit 14.

Computer 18 may also optionally further modify image 12 and/or overlay 16, if desired. For example, in some embodiments, computer 18 may merge overlay 16 into image 12 to produce a new image that contains overlay 16 and discards the original wall colors.

Figure 5A:
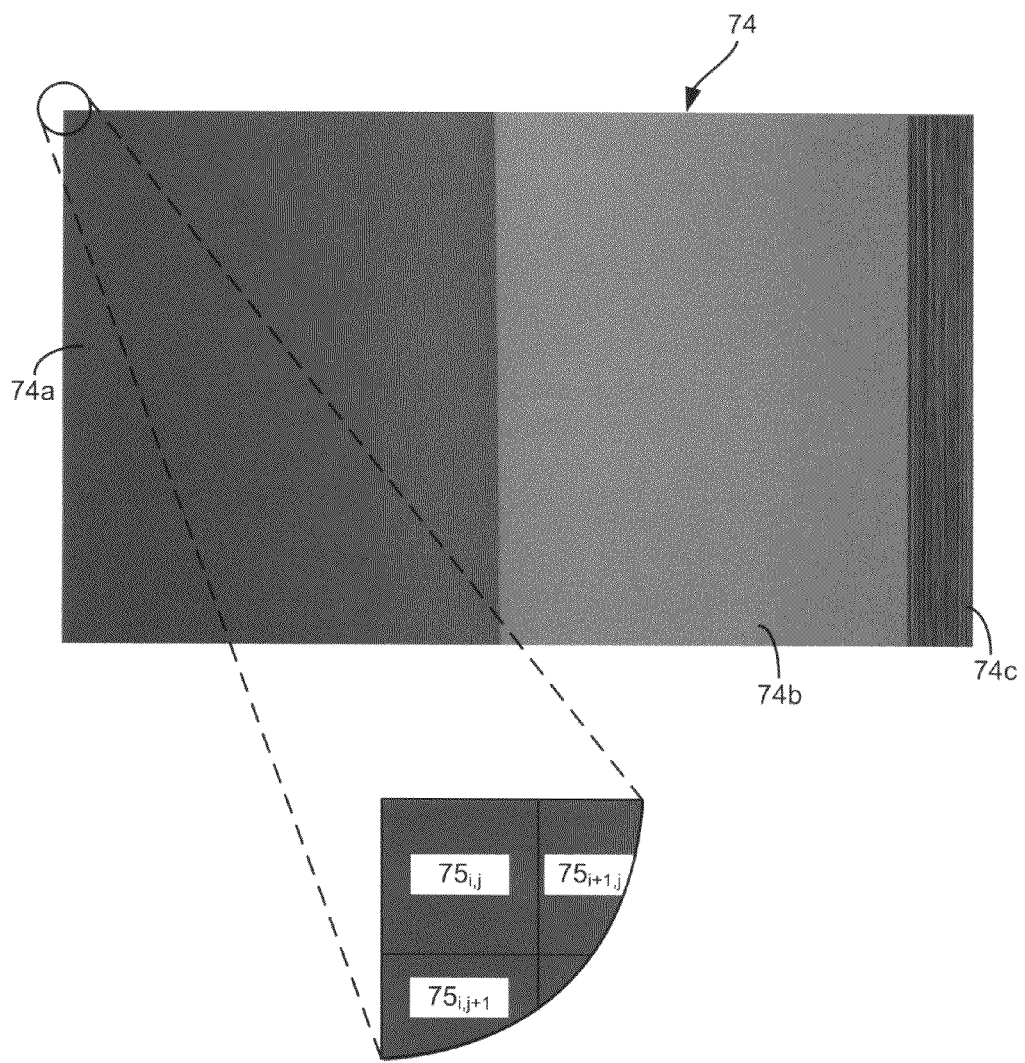
FIGS. 5A-5M are illustrations and color photographs depicting the method for virtually painting an image with the color-matching tool application.

FIGS. 5A-5M illustrate an example image, referred to as image 74, that may be virtually painted using CMT application 10, pursuant to method 40. As shown in FIG. 5A, in this example, image 74 depicts a wall corner having a left-side wall 74a that is darker than its right-side wall 74b due to shadowing. Image 74 also includes a wood trim 74c adjacent to the right-side wall 74b. Data-wise, image 74 includes a matrix of pixel units $75_{i,j} \ldots 75_{n,m}$, where image 74 includes n rows pixel units 75 with m pixel units 75 in each row. Each pixel unit 75 preferably includes color data (e.g., an RGB triplet or a LAB triplet) to collectively define the colors of walls 74a and 74b, as well as trim 74c.

Figure 5B:
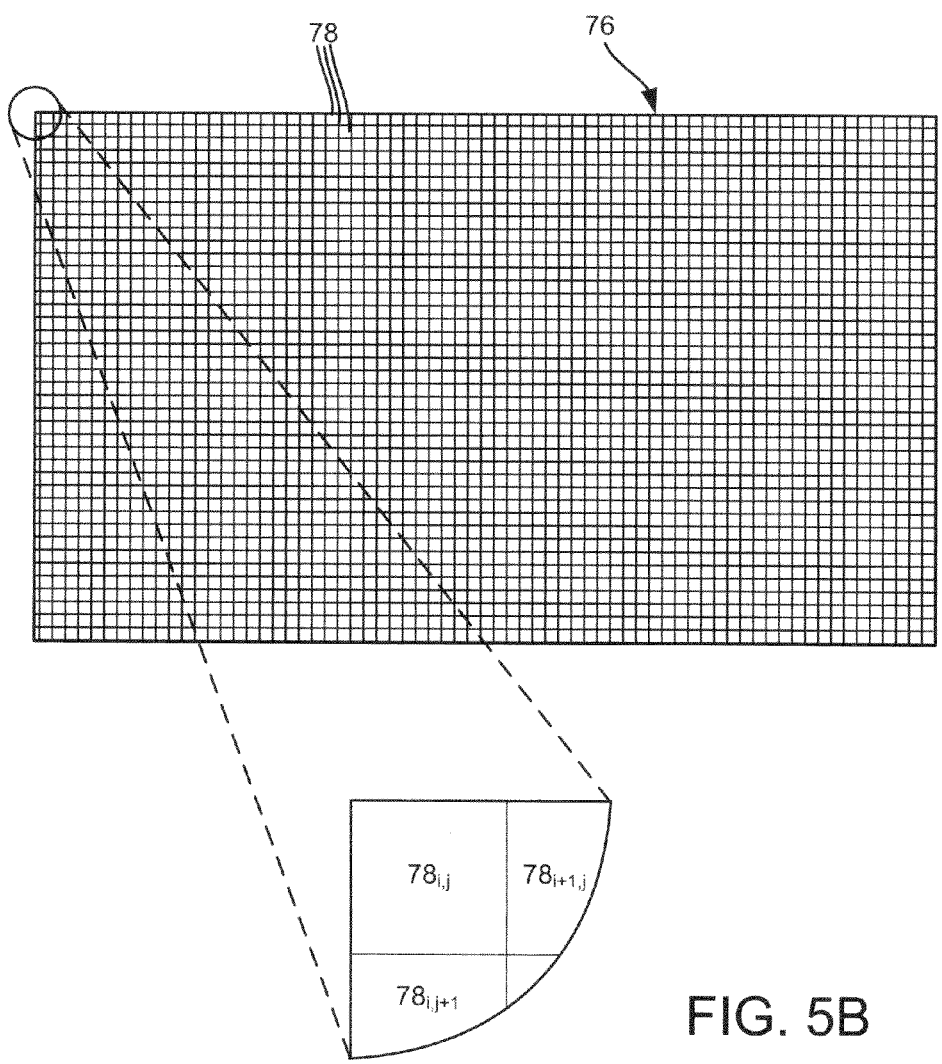

As shown in FIG. 5B, after image 74 is received and optionally edited with CMT application 10 (steps 42 and 44 of method 40), computer 18 may generate luminosity map 76, pursuant to step 46 of method 40. Luminosity map 76 includes a matrix of luminosity values $78_{i,j} \ldots 78_{n,m}$, each preferably corresponding to one of the pixel units 75 in image 74. As discussed above, each luminosity value 78 may be determined by averaging the values of the color channels in the RGB triplet of the corresponding pixel unit 75, or by the L-components in the LAB triplets.

Figure 5C:
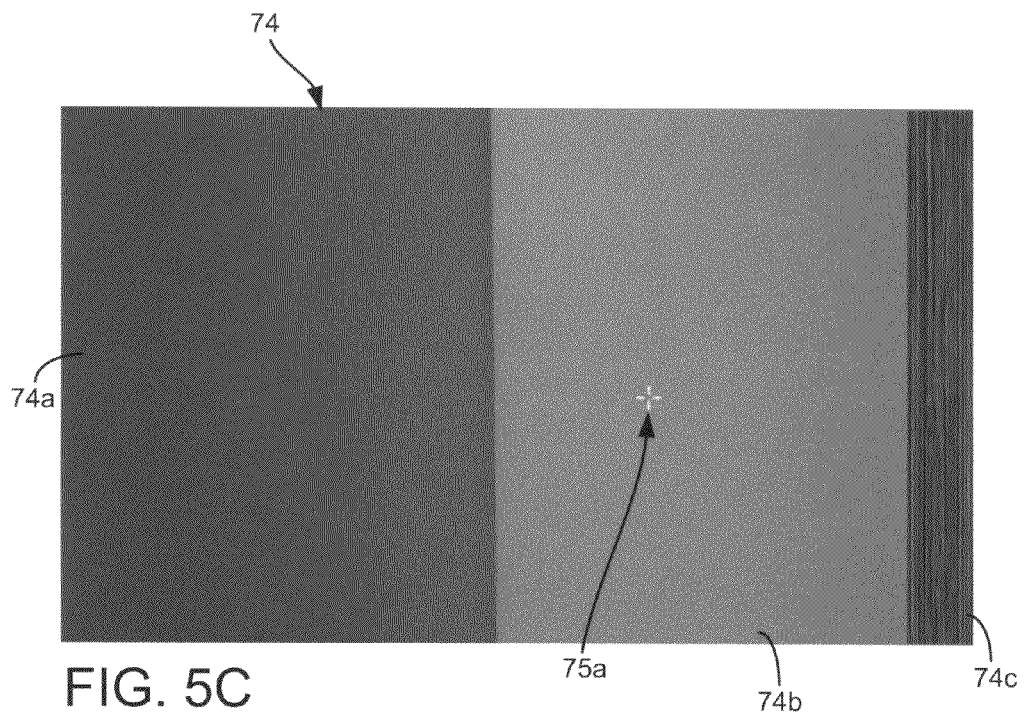
Figure 5D:
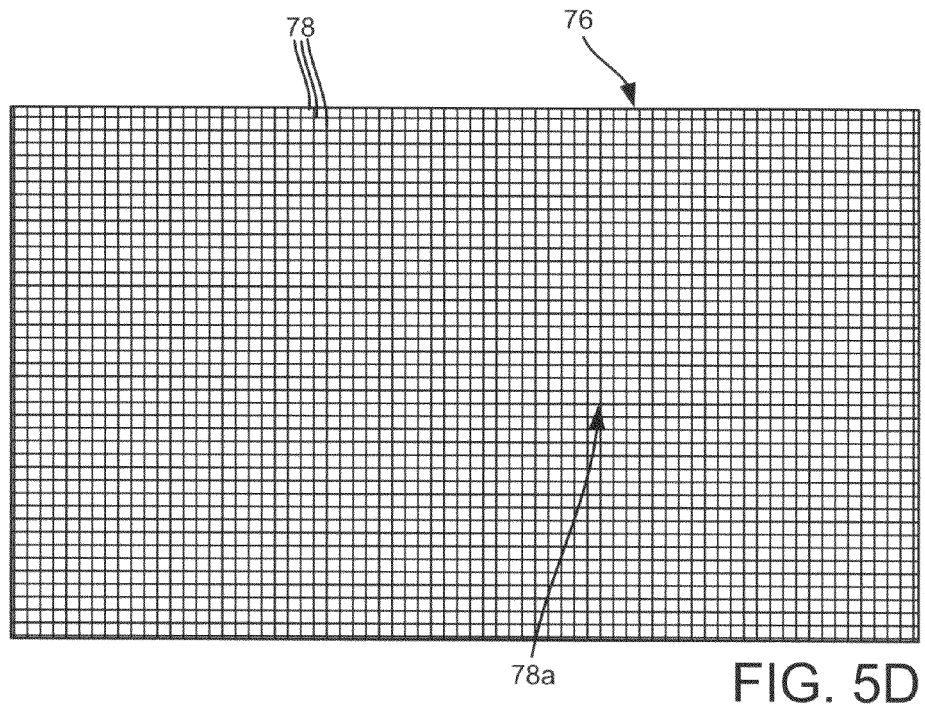

As shown in FIG. 5C, pursuant to step 48, the user may then select one of the pixel units 75 as a reference pixel unit selection having the desired midpoint brightness of the wall. In the current example, the user may select reference pixel unit 75a. As shown in FIG. 5D, pursuant to step 50, computer 18 may then look up or otherwise identify the luminosity value 78 in luminosity table 76 (retained in storage media 12) that corresponds to pixel unit 75a, and assign it as a reference luminosity value 78a (pursuant to step 52).

Figure 5E:
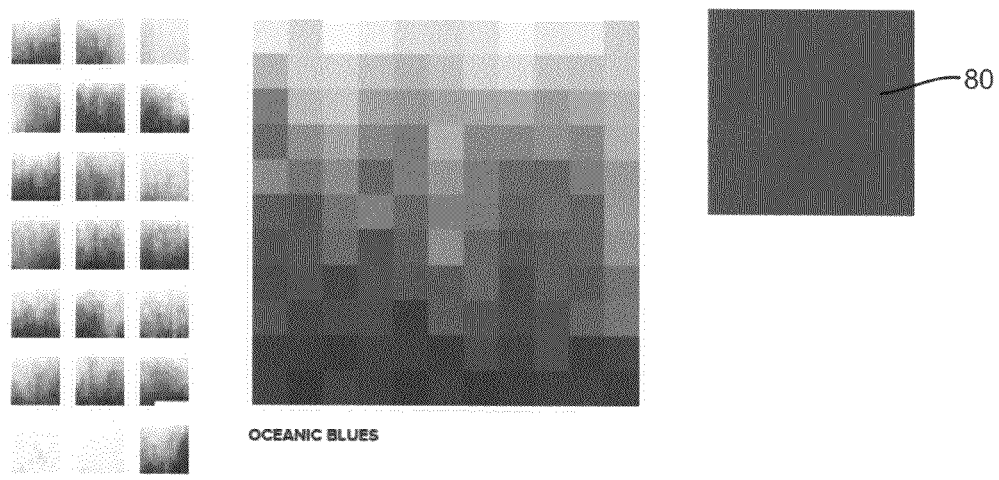
Figure 5F:
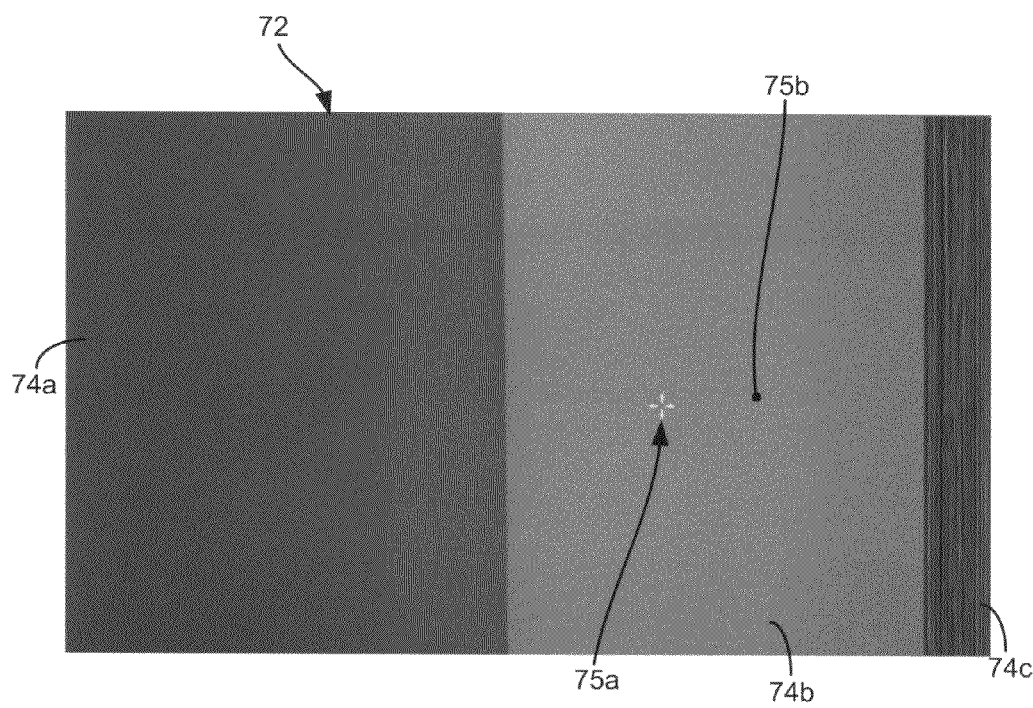
Figure 5G:
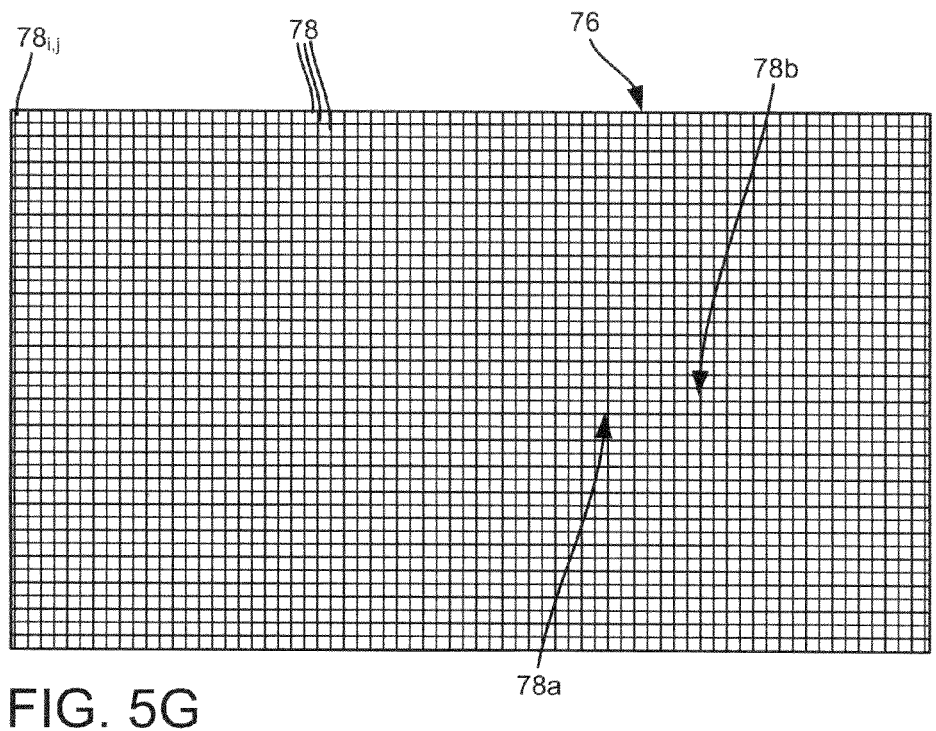

As shown in FIG. 5E, pursuant to step 54, CMT application 10 may then prompt the user to select a new color from color palette 34. For example, the user may select a blue color 80, or any other desired color, from color palette 34. As shown in FIG. 5F, pursuant to step 56, the user may then select the wall or other surface to be virtually painted, such as by selecting one of the pixel units 75 of walls 74a and 74b (or by outlining a region of pixel units in image 74). In the current example, the user may select pixel unit 75b. As discussed above, in an alternative embodiment, CMT application 10 may automatically use the reference pixel unit 75a as this selected pixel unit 75b.

Pursuant to step 58, computer 18 may then determine the boundaries to be virtually painted based on a threshold range relative to the color value and/or luminosity value of the selected pixel unit 75b, as discussed above. In a preferred embodiment, the threshold range may be based on the luminosity values 78 in luminosity map 76. For example, computer 18 may compare the luminosity value 78 of each pixel unit 75 in image 74 to the luminosity value corresponding to selected pixel unit 75b, referred to as luminosity value 78b (shown below in FIG. 5G). For a given pixel unit 75, if the difference between these compared values fall within the threshold range, then the pixel unit 75 is assigned to be virtually painted. If not, then it is not considered part of walls 74a and 74b.

In the current example, the pixel units 75 of walls 74a and 74b may fall within the threshold range of the color value and/or luminosity value 78b of pixel unit 75b due to their similar colors and brightnesses. However, the pixel units 75 of trim 74c would fall outside of the threshold range since the wood colors and brightness of trim 74c are substantially different from those of walls 74a and 74b.

Computer 18 may then generate and display an overlay over walls 74a and 74b of image 74, pursuant to the following steps 60-72 of method 40, where the overlay preferably does not extend into the region of trim 74c. For example, computer 18 may proceed to a first pixel unit of walls 74a and 74b, such as pixel unit $75_{i,j}$ (step 60), and retrieve the corresponding luminosity value $78_{i,j}$ from luminosity map 76 (step 62).

Computer 18 may then calculate or otherwise determine the difference between reference luminosity value 78a of reference pixel unit 75a and luminosity value $78_{i,j}$ of pixel unit $75_{i,j}$ (step 64). In the current example, the location of pixel unit $75_{i,j}$ in image 74 (upper left corner of left-side wall 74a) is darker than the location of reference pixel unit 75a. As such, the luminosity difference will be a positive number in this example.

Computer 18 may then store this luminosity difference in storage media 26, and apply it to the color data of color 80 (selected in step 54) (step 66). For example, if the calculated luminosity difference is "12", this value may divided by the number of color channels in the color data, and the resulting value may be subtracted from each RGB color channel in the RGB triplet. If the blue color 80 has an RGB triplet of (65; 105; 255), the calculated luminosity difference of "12" may be divided by three to produce a value of "4", which may be subtracted from each color channel of the RGB triplet to produce (61; 101; 251). Alternatively, the "12" value may be subtracted from the L-component of the LAB triplet, if used.

Figure 5H:
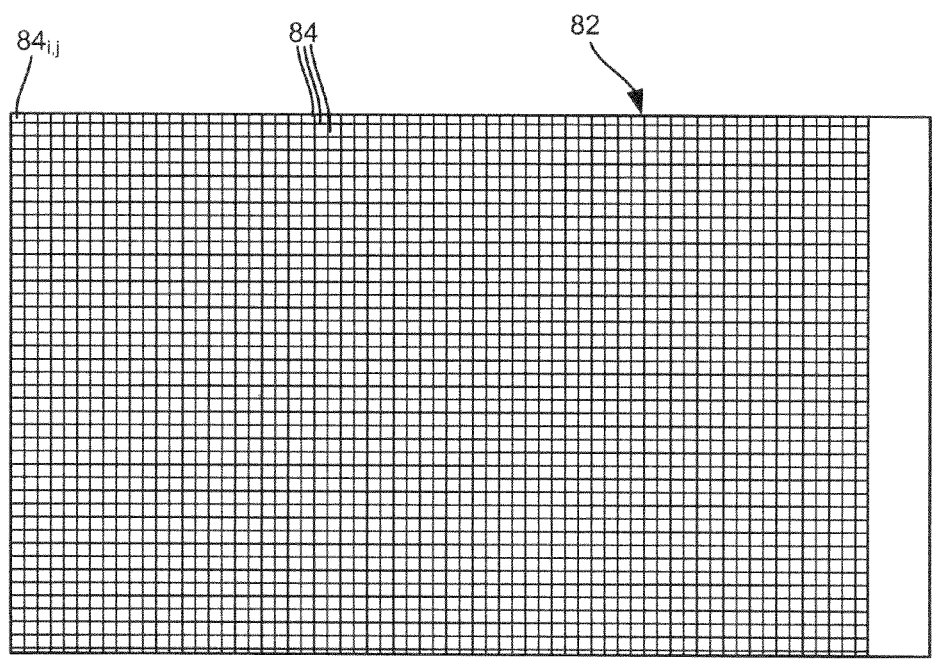

As shown in FIG. 5H, computer 18 may then store this RGB triplet (or LAB triplet) in storage media 26 to begin generating an overlay map 82 having overlay pixel units $84_{i,j} \ldots 84_{x,y}$, corresponding to the dimensions of walls 74a and 74b. Accordingly, computer 18 may apply the RGB triplet (69; 109; 214) to overlay pixel unit $84_{i,j}$, which corresponds to image pixel unit $75_{i,j}$. Alternatively, computer 18 may directly replace the color data of image pixel unit $75_{i,j}$ rather than generating a separate overlay map 82 to merge the overlay with the original image 74. However, maintaining a separate overlay map 82 allows a user to switch between different colored overlays without modifying the original image 74.

Figure 5I:
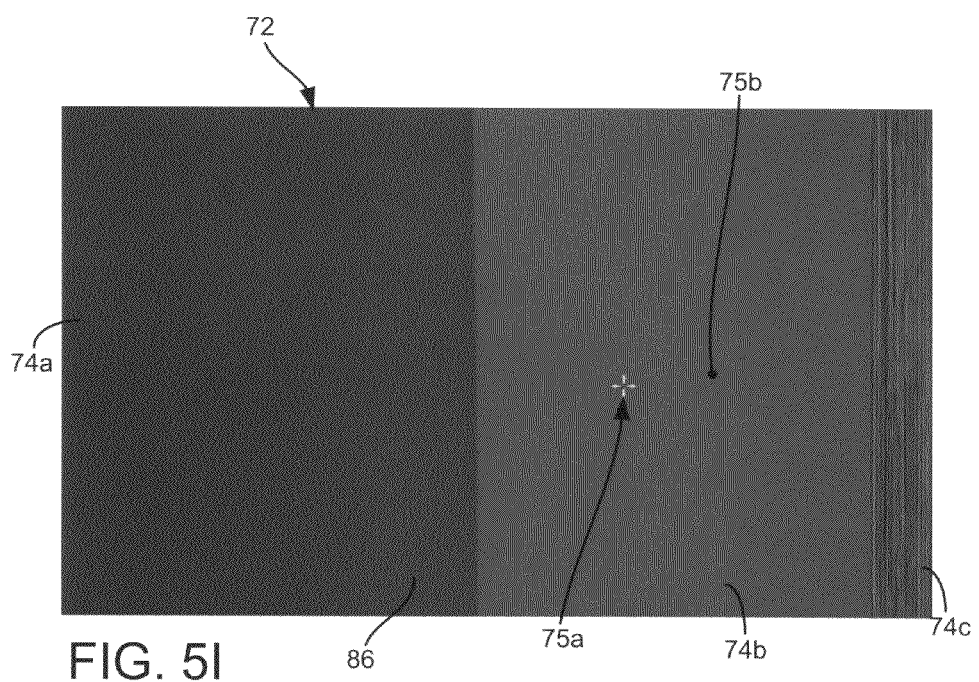

Computer 18 may then repeat the same process of each pixel unit 75 of walls 74a and 74b to complete overlay map 82, and, as shown in FIG. 5I, may display overlay 86 over image 74 to virtually paint walls 74a and 74b with the selected blue color. As can be seen in FIG. 5I, overlay 86 does not extend over trim 74c, and has brightness levels corresponding to those of the original walls 74a and 74b in image 74. For example, the overlay pixel units 84 of the left-side wall 74a are darker than those of the right-side wall 74b due to shadowing of left-side wall 74a. Furthermore, the color data of the overlay pixel units 84 are relative to the reference luminosity value 78a of reference pixel unit 75a, which simulates how the lighting conditions, such as shadows and direct light (e.g., sunlight or artificial light), can affect how the selected color appears to the human eye.

Figure 5J:
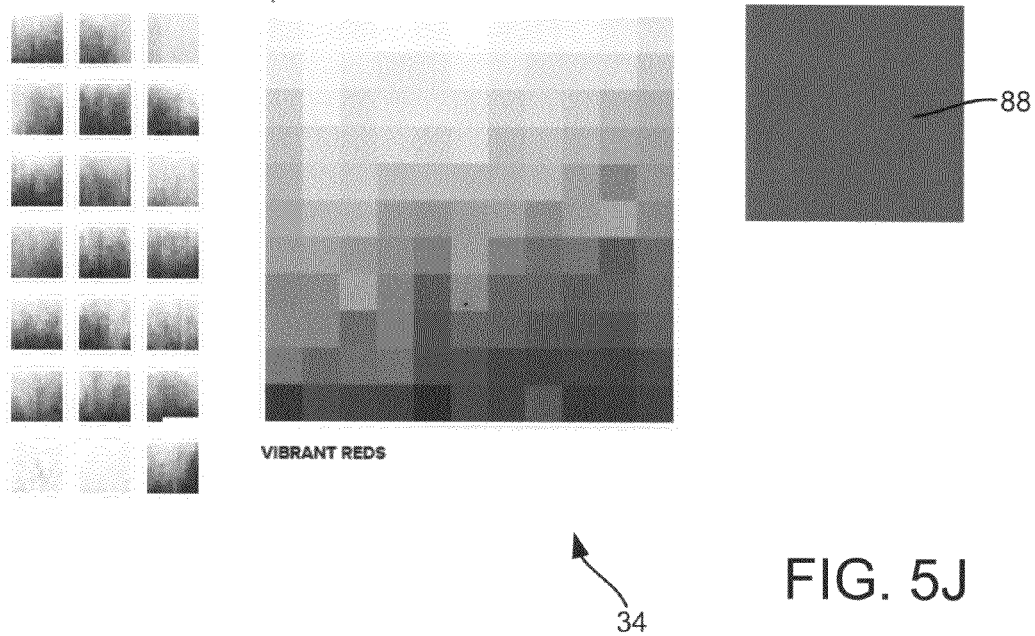
Figure 5K:
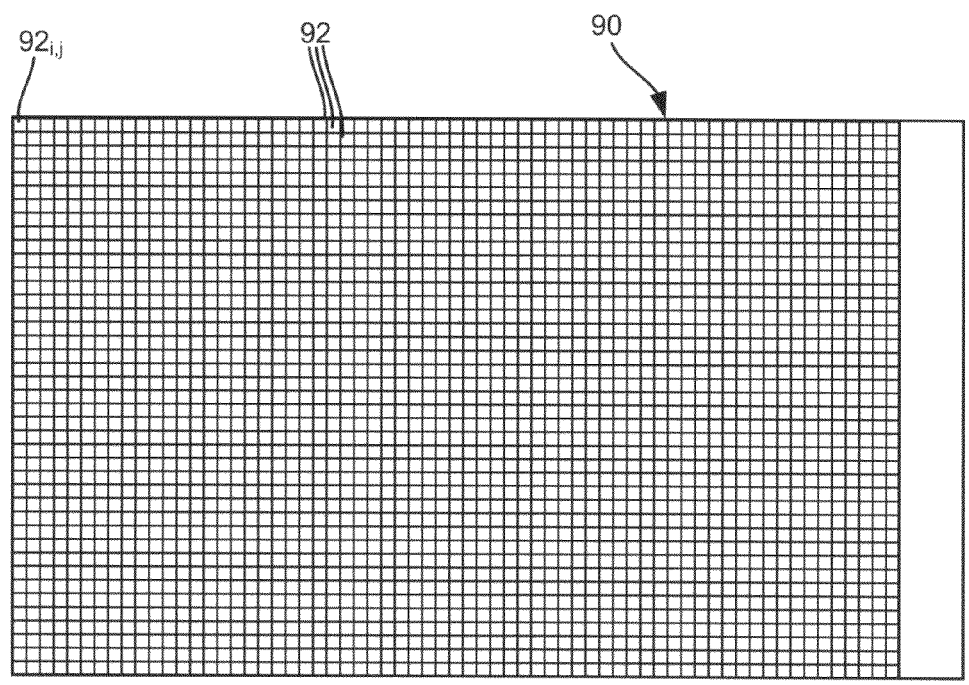

As mentioned above, the user may also change the color of overlay 86, if desired. For instance, CMT application 10 may allow the user to select a different color from color palette 34. As shown in FIG. 5J, if the user selects a red color 88, computer 18 may use the luminosity differences of each overlay pixel unit 84 of overlay map 82 that were previously calculated in step 64 of method 40, and apply them to the color data of color 88, pursuant to step 66 of method 40 to generate overlay map 90 having overlay pixel units $92_{i,j} \ldots 92_{x,y}$, as shown in FIG. 5K.

Figure 5L:
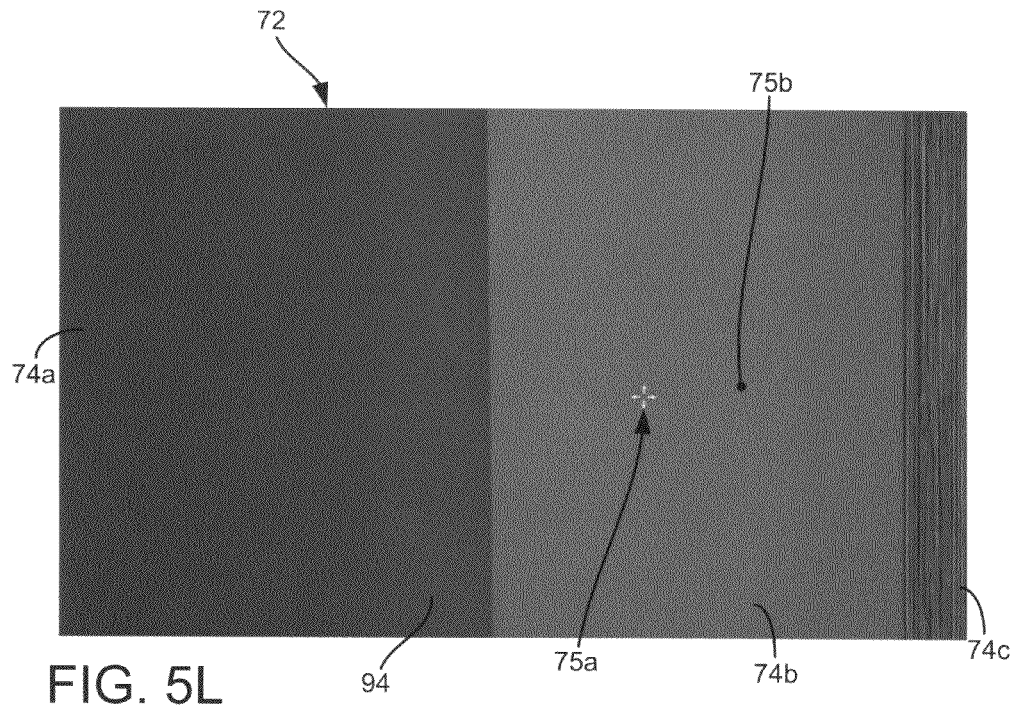

As shown in FIG. 5L, computer 18 may then use the color data in overlay pixel units 92 to display overlay 94 over image 74 to virtually paint walls 74a and 74b with the selected red color. As shown, overlay 94 also does not extend over trim 74c, and has brightness levels corresponding to those of the original walls 74a and 74b in image 74. For example, the overlay pixel units 92 of the left-side wall 74a are darker than those of the right-side wall 74b due to shadowing of left-side wall 74a.

Furthermore, the color data of the overlay pixels 92 are also relative to the reference luminosity value 78a of reference pixel unit 75a, which simulates how the lighting conditions, such as shadows and direct light (e.g., sunlight or artificial light), can affect how the selected color appears to the human eye. This can be further illustrated in FIG. 5M. If desired, the user may use CMT application 10 to move the reference pixel unit from pixel unit 75a to another location in image 74, such as at pixel unit 75c. This resets the reference luminosity value from the luminosity value 78a to *a* second luminosity value 78 in luminosity map 76 that corresponds to pixel unit 75c.

Figure 5M:
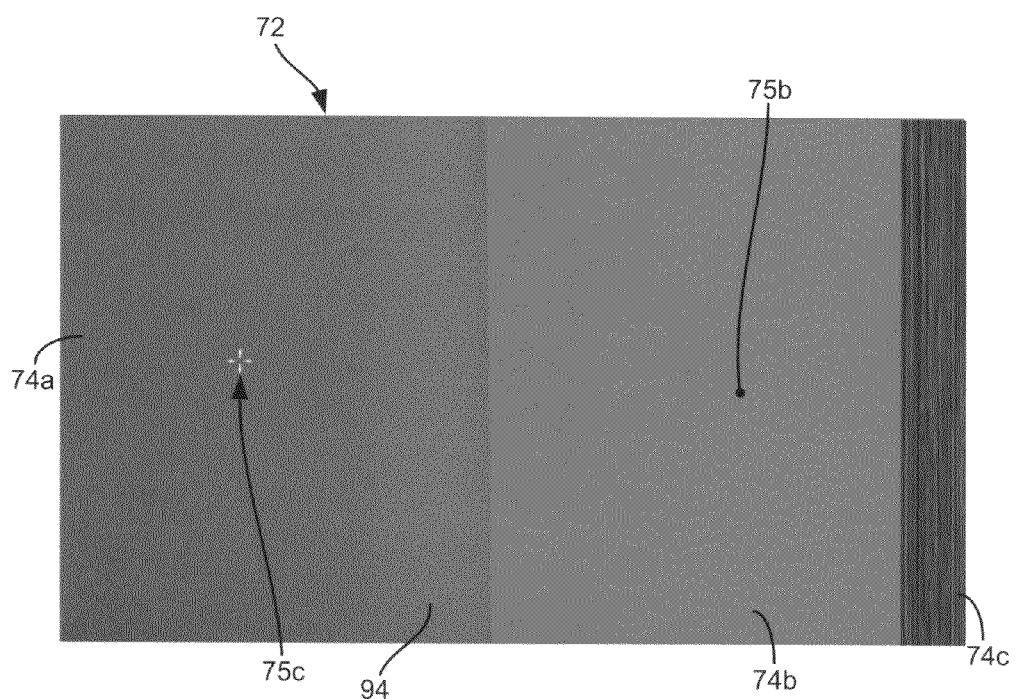

In this example, since the pixel unit 75c is darker than the previous pixel unit 75a, the new reference luminosity value will be darker, thereby increasing the brightness of each pixel unit 92 in overlay 94, as shown by comparing the brightness differences of overlay 94 in FIGS. 5L and 5M. This difference illustrates how the different lighting conditions can affect color when virtually painting images, and the benefits of incorporating a user-selected reference pixel unit for setting a desired midpoint brightness.

The user may then repeat the above-discussed steps for generating additional overlays as desired until a final color is obtained. As discussed above, the user may then use CMT application 10 to order the paint. For instance, after identifying one or more final colors, the user may use CMT application 10 to order test samples of paint having the final color(s) and then paint test swatches with the paint samples. In this situation, the user may use CMT application 10 to screen possible colors that the user may wish to then test out before making an official decision on which paint to purchase in larger volume.

Figure 6:
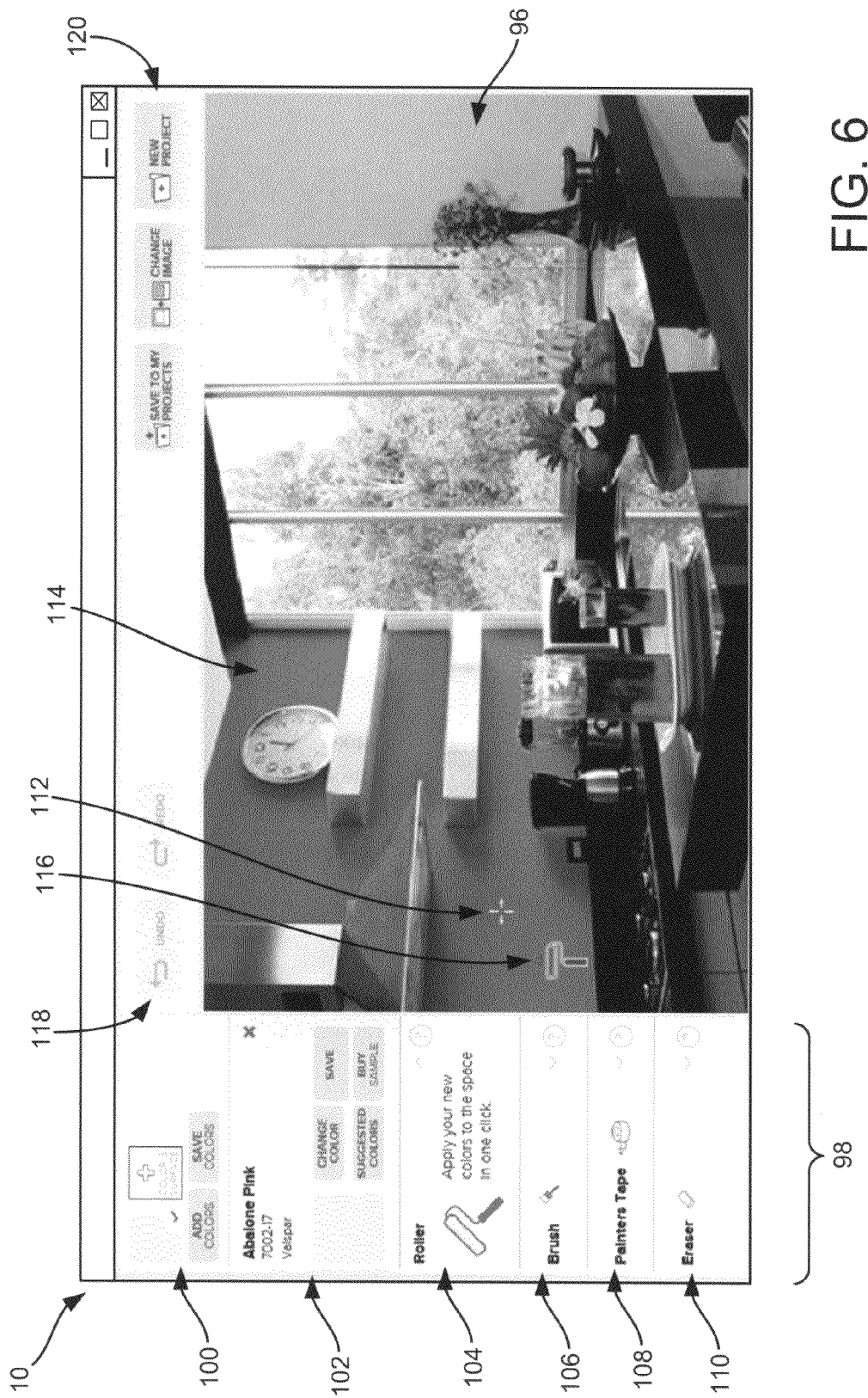
FIG. 6 is an illustration of the color-matching tool application with a received digital image, illustrating an example user interface and menu tools.

FIG. 6 illustrates an example interface of CMT application 10 for virtually painting walls or other surfaces of images, such as image 96. As shown in this embodiment, CMT application 10 may include tool menu 98 extending around the top and left-side borders of image 96. In alternative embodiments, tool menu 98 may reside at any suitable location relative to image 96.

Tool menu 98 preferably includes overlay menu 100, color menu 102, painting menu 104, touch-up menu 106, painter tape menu 108, and eraser menu 110. Overlay menu 100 preferably provides user options for generating overlays (e.g., overlays 16, 86, and 94) for virtually painting walls or surfaces in image 96. Overlay menu 100 may also allow the user to switch between the generated overlays, such as between the blue overlay 86 and the red overlay 94 (shown above in FIGS. 5I, 5L, and 5M).

Color menu 102 may provide user options for changing the colors of each generated overlay, for receiving suggested overlay colors, and for purchasing samples of the paints. As discussed above, CMT application 10 may link to color palette database 34 and paint inventory database 36 (shown in FIG. 3) to purchase paint having the final-selected color.

Painting menu 104 preferably allows the user to select which wall to virtually paint, pursuant to step 56 of method 40 (shown in FIG. 4). For example, as shown in FIG. 6, after the user selects reference pixel 112 on wall 114 in image 96, CMT application 10 may display a cursor 116, such as in image of a painting roller, which allows the user to select a location on wall 114. As discussed above, pursuant to step 58 of method 40, computer 18 may then determine the surface boundaries of wall 114 based on the surface location selected with cursor 116.

In the current example, computer 18 may generate an overlay map (corresponding to overlap maps 82 and 90) having dimensions corresponding to the green-colored regions of wall 114. As discussed above, the dimensions of the overlay map from the selected reference location may vary depending on the threshold range utilized by CMT application 10. In some embodiments, painting menu 104 may also include a user selection to increase or decrease the threshold range.

Touch-up menu 106 preferably provides the user with a tool (e.g., a brush cursor) to manually touch up the generated overlay with additional overlay pixel units. For example, if the generated overlay does not cover the entirety of wall 114 (e.g., due to the threshold range being too low), the user may select touch-up menu 106 and virtually paint additional pixel units in image 96, as desired. Touch-up menu 106 may also include user options to increase the brush width used to touch up image 96, where the brush width may be based on pixel unit areas.

After the user virtually paints one or more pixel units with touch-up menu 106, computer 18 preferably adjusts the brightness levels of these pixel units in the same manner as discussed above for initially generating the overlay. As such, for each touch-up pixel unit, computer 18 preferably retrieves the corresponding luminosity values from the luminosity map, calculates the luminosity difference relative to the reference luminosity value (at reference pixel 112), applies the difference to generate an overlay pixel unit, and displays the updated overlay, pursuant to steps 62, 64, 66, and 72 of method 40.

Painter tape menu 108 may provide a user tool to mask one or more regions in image 96 to prevent the overlay from being generated in these regions. This may be used for a variety of purposes, such as for preventing the overlay from being generated over non-wall surfaces that are similar in color to the selected walls (e.g., furniture). Furthermore, painter tape menu 108 may be used to mask portions of the selected walls to create stripe effects when virtually painting the walls.

Eraser menu 110 may provide a user tool that works opposite of touch-up menu 106, allowing the user to erase portions of the generated overlay to expose the underlying image 96 at the erased locations. Eraser menu 106 may also include user options to increase the eraser width used to touch up image 96, where the eraser width may be based on different pixel unit areas.

CMT application 10 may also include undo/redo options 118 and project selection options 120, which may each function in a conventional manner. As can be appreciated, CMT application 10 is beneficial for virtually painting walls or other surfaces based on the lighting conditions from the original photographs or images, and based on the users' own knowledge of the lighting conditions in the rooms or areas where the photographs were taken. This increases the ease and versatility in which users can select paint colors for a variety of different surfaces and lighting conditions.

Although the present disclosure has been described with reference to preferred embodiments, workers skilled in the art will recognize that changes may be made in form and detail without departing from the spirit and scope of the disclosure.

The invention claimed is:

1. A method for virtually painting an image with a computer system comprising a processor, a computer storage medium and a user interface, the method comprising:
    providing an image to the computer storage medium having a plurality of image pixel units, wherein each image pixel unit comprises first color data;
    generating with the processor a luminosity map having a plurality of luminosity values based on the first color data from the image pixel units;
    receiving a selection of one of the image pixel units;
    setting a reference luminosity value based at least in part on a luminosity value of the selected image pixel unit;
    receiving a selection of a color for virtually painting the image, the selected color comprising second color data;
    calculating with the processor luminosity differences between the reference luminosity value and the luminosity values of the image pixels;
    generating with the processor overlay pixel units based on the calculated luminosity differences and the second color data; and
    displaying on the user interface the generated overlay pixel units as an overlay with the image.

2. The method of claim 1, wherein the first color data of the image pixel units each comprises an RGB triplet having a red channel, a green channel, and a blue channel, and wherein, for each of the image pixel units, the step of generating the luminosity map comprises averaging values of the red channel, the green channel, and the blue channel to provide the luminosity value.

3. The method of claim 1, wherein the first color data of the image pixel units each comprises a LAB triplet, and wherein for each of the image pixel unit, the step of generating the luminosity map comprises storing an L-component of the LAB triplet to provide the luminosity value.

4. The method of claim 1, wherein calculating the luminosity differences between the reference luminosity value and the luminosity values of the image pixel unit comprises calculating the luminosity differences as luminosity percentage differences relative to a luminosity scale for the first color data.

5. The method of claim 4, wherein generating the overlay pixel units based on the calculated luminosity differences and the second color data comprises, for each image pixel unit, adjusting the each color channel in the second color data by the calculated luminosity percentage difference.

6. The method of claim 1, wherein generating the overlay pixel units based on the calculated luminosity differences and the second color data comprises:
for each image pixel unit, dividing the calculated luminosity difference by a number of color channels in the second color data to produce a resulting value; and
subtracting the resulting value from each color channel of the second color data.

7. The method of claim 1, wherein generating the overlay pixel units based on the calculated luminosity differences and the second color data comprises subtracting the calculated luminosity difference from an L-component of a LAB triplet of the second color data.

8. The method of clam 1, and further comprising determining a boundary in the image for generating the overlay pixel units, wherein the overlay pixel units are not generated outside of the determined boundary.

9. The method of claim 8, wherein determining the boundary comprises comparing differences between the luminosity values of the image pixel units to a threshold range.

10. A method for virtually painting an image with a computer system having a processor and a computer storage medium, the method comprising:
receiving an image to the computer storage medium, the received image having a plurality of image pixel units, wherein each image pixel unit comprises first color data;
generating luminosity values with the processor based on the first color data of the image pixel units;
receiving a selection of one of the image pixel units;
setting a reference luminosity value based at least in part on a luminosity value of the selected image pixel unit;
calculating a luminosity difference between the reference luminosity value and the luminosity value of at least a second pixel unit of the image pixel units with the processor; and
generating an overlay pixel unit with the processor based on the calculated luminosity difference and second color data of a color for virtually painting the image.

11. The method of claim 10, wherein calculating the luminosity difference between the reference luminosity value and the luminosity value of the second image pixel unit comprises calculating the luminosity difference as luminosity percentage difference relative to a luminosity scale for the first color data, and generating the overlay pixel unit based on the calculated luminosity difference and the second color data comprises adjusting the each color channel in the second color data by the calculated luminosity percentage difference.

12. The method of claim 10, wherein generating the overlay pixel unit based on the calculated luminosity difference and the second color data comprises:
dividing the calculated luminosity difference by a number of color channels in the second color data to produce a resulting value; and
adding the resulting value to each color channel of the second color data.

13. The method of claim 12, wherein generating the overlay pixel units based on the calculated luminosity differences and the second color data comprises subtracting the calculated luminosity difference from an £-component of a LAB triplet of the second color data.

14. The method of claim 10, and further comprising
receiving a selection of a third pixel unit of the image pixel units of the received image;
identifying a second reference luminosity value corresponding to the third pixel unit;
calculating a second luminosity difference between the second reference luminosity value and the luminosity value of the second pixel unit with the processor; and
generating a second overlay pixel unit with the processor based on the calculated second luminosity difference and the second color data.

15. A method for virtually painting an image with a computer system comprising a processor and a computer storage medium, the method comprising:
receiving by the computer storage medium an image having a plurality of image pixel units, wherein at least a portion of the plurality of image pixel units define a digital representation of a photographed surface;
calculating with the processor a luminosity value for each of the plurality of image pixel units;
receiving a selection of one of the image pixel units within the photographed surface;
setting a reference luminosity value based at least in part on a luminosity value of the selected image pixel unit;
receiving a selected color having color data;
determining with the processor a boundary of the photographed surface;
calculating with the processor luminosity differences between the reference luminosity value and the luminosity values of the image pixel units within the determined boundary; and
generating with the processor overlay pixel units based on the calculated luminosity differences and the color data of the selected color.

16. The method of claim 15, wherein calculating the luminosity value for each of the plurality of image pixel units comprises averaging color channel values of the image pixel unit.

17. The method of claim 15, wherein determining the boundary comprises comparing differences between the luminosity values of the image pixel units to a threshold range.

18. The method of claim 15, wherein generating the overlay pixel units based on the calculated luminosity differences and the color data comprises:
for each image pixel unit within the determined boundary, dividing the calculated luminosity difference by a number of color channels in the color data to produce a resulting value; and
adding the resulting value to each color channel of the color data.

19. The method of claim 15, and further comprising prompting the selection of the color from a color palette.

20. The method of claim 15, wherein each of the image pixel units comprises an RGB triplet, a LAB triplet, or combinations thereof.

* * * * *